(12) United States Patent
Robitaille

(10) Patent No.: US 7,273,290 B1
(45) Date of Patent: Sep. 25, 2007

(54) DISPLAY DEVICE HAVING AUTOMATED LAMP REPLACEMENT

(75) Inventor: Blaise Rene Joseph Robitaille, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 369 days.

(21) Appl. No.: 11/015,938

(22) Filed: Dec. 17, 2004

(51) Int. Cl.
*F21V 33/00* (2006.01)

(52) U.S. Cl. .................... 362/20; 362/285; 362/287

(58) Field of Classification Search ............... 362/20, 362/285, 286, 287

See application file for complete search history.

(56) References Cited

U.S. PATENT DOCUMENTS

| | | | |
|---|---|---|---|
| 4,402,038 A | * | 8/1983 | Hartung et al. ............... 362/20 |
| 5,980,053 A | * | 11/1999 | Hauser et al. ................. 362/20 |
| 6,776,490 B2 | | 8/2004 | Soper et al. |

* cited by examiner

*Primary Examiner*—Laura Tso
(74) *Attorney, Agent, or Firm*—Leonard A. Alkov; H. Saint St. Julian; John J. Horn

(57) ABSTRACT

A display device includes a lamp having an output light beam, wherein the lamp is disposed in a lamp alignment position when it projects the output light beam A spatial light modulator receives the output light beam and controllably spatially modulates the intensity of the output light beam, and an optics system that projects the spatially modulated output light beam. There is a lamp mount upon which the lamp and at least one spare lamp are supported. The lamp mount selectively and controllably moves one of the lamp and the at least one spare lamp into the lamp alignment position.

21 Claims, 3 Drawing Sheets

DISPLAY DEVICE HAVING AUTOMATED LAMP REPLACEMENT

This invention relates to a display device in which an output light beam is spatially modulated to present visual information and, more particularly, to such a display device in which the lamp producing the output light beam may be changed in an automated fashion.

BACKGROUND OF THE INVENTION

One type of display device operates by spatially modulating an output light beam and projecting the spatially modulated output light beam onto a display surface. The source of the output light beam may be of any operable type, but one common approach is to provide a metal halide lamp that produces the output light beam. Many different types of reflective and transmission spatial light modulators are known to modulate the output light beam with the desired visual information.

With increasing time of use, the output light beam of the lamp changes. The intensity may fade, reducing the brightness of the display. Eventually, the lamp fails ("burns out"), eliminating the displayed image entirely. Lamps are the one component of the display device whose performance is known to become impaired over a relatively short period of time in service, but the time associated with this impaired operation is not readily predicted with precision. Additionally, the lamp may be damaged while in service by shock loadings or the like, so that its light output is partially or completely lost.

In most applications, the degraded or failed lamp is readily replaced. There is a short period in which the display device is out of service when the lamp is replaced. The out-of-service period produces nothing more than a minor inconvenience.

In other applications, however, the loss of display brightness or complete loss of service, even for a short time, may be much more serious. For example, modern military forces rely heavily on data displays. The unacceptably high degradation or loss of service of a military display device in combat, even for a few minutes, may have disastrous consequences. Further, a military display device may operate with a sealed housing that makes it difficult or impossible to gain access to the interior of the device to replace the lamp while the display device is in combat service. If the light output of the lamp of such a display device drastically degrades or fails during combat, the display device becomes inoperable and essentially eliminates its user as an effective participant in the battle.

There is a need for an improved approach to display devices in which the lamp illumination source may degrade or fail in service. The need is particularly acute where impairment of the display device for any significant period of time may have major adverse consequences, and where the replacement of the lamp is difficult. The present invention fulfills this need, and further provides related advantages.

SUMMARY OF THE INVENTION

The present invention provides a display device having automated lamp replacement. As the lamp that provides display illumination experiences reduced light output, when it fails, or under other preselected conditions, the lamp may be replaced in an automated fashion, even where the lamp is relatively inaccessible. This automated replacement capability is particularly important where even a short time without the display is of serious concern, where field replacement is difficult as where the lamp is contained within a sealed housing, or where the mean time to failure (MTTF) of the lamp type is relatively short.

In accordance with the invention, a display device comprises a lamp having an output light beam. The lamp is disposed in a lamp alignment position when it projects the output light beam. The display device further includes a spatial light modulator that receives the output light beam and controllably spatially modulates the intensity of the output light beam, and an optics system that projects the spatially modulated output light beam. There is a lamp mount upon which the lamp and at least one spare lamp are supported. The lamp mount selectively and controllably moves one of the lamp and the at least one spare lamp into the lamp alignment position.

In a typical case, there is a housing in which the lamp, the spatial light modulator, the optics system, and the lamp mount are enclosed. The housing may be sealed, making interior access under field conditions difficult. In one display device of interest, a display screen forms a wall of the unsealed or sealed housing.

The lamp may be a metal halide lamp operating at a power of from about 10 to about 24 watts. Lamps in this wattage range are sometimes used for displays having sealed housings because they do not generate as much heat as more-conventional lamps in the 100-watt range. The heat produced by lamps in the 100-watt range can produce overheating of sensitive components operating in sealed housings where heat removal is restricted. Lamps in the 10-24-watt range produce sufficient light for the display device and produce lower heat loadings. However, such lamps typically have a shorter mean time to failure (MTTF) than do the higher-wattage lamps. The present approach is therefore advantageously used with such shorter MTTF lamps. However, the present approach is also applicable to other types of lamps, such as incandescent lamps, or lamps operating in other wattage ranges.

In one structure according to the present approach, the lamp mount comprises a lamp support base upon which the lamp and the at least one spare lamp are supported, and a support base drive that moves the lamp support base between a first support-base position in which the lamp is disposed in the lamp alignment position and additional support-base positions in which each of the spare lamps is respectively disposed in the lamp alignment position.

In any of the embodiments, the movement of the lamp support base may be driven by a motor or manually through an external mechanical linkage. Where there is a motor drive, there may be a lamp-mount controller that controls the support base drive to move the respective lamps into the lamp alignment position. The lamp-mount controller may include any operable type of control. Examples include a manually operated switch, a timer, or a monitor of the intensity of the output light beam or the spatially modulated output light beam. Where there is a manual drive, a manual control of the manually operated support base drive, such as a hand-operated lever, preferably extends outside of the housing.

In a preferred embodiment, a display device comprises a metal halide lamp operating at a power of from about 10 to about 24 watts and having an output light beam. The lamp is disposed in a lamp alignment position when it projects the output light beam. A spatial light modulator receives the output light beam and controllably spatially modulates the intensity of the output light beam. An optics system projects the spatially modulated output light beam. The display device includes a lamp mount upon which the lamp and at least one spare lamp are supported. The lamp mount selectively and controllably moves one of the lamp and the at least one spare lamp into the lamp alignment position. There is a sealed housing in which the lamp, the spatial light modulator, the optics system, and the lamp mount are enclosed. Other compatible features as described herein may be used with this embodiment.

The present approach allows the lamp to be changed in an automated fashion according to any operable criterion. The lamp may be changed upon failure, or upon a loss of brightness of a preselected amount, or at a preselected interval. The automatic changing may be accomplished with minimal or no loss of service, even with a sealed housing. The replacing of the lamp does not require a person to contact or grasp the lamp, an important advantage in some situations such as during combat, when there is an increased likelihood that the replacement lamp could be dropped or otherwise damaged during the replacement operation.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
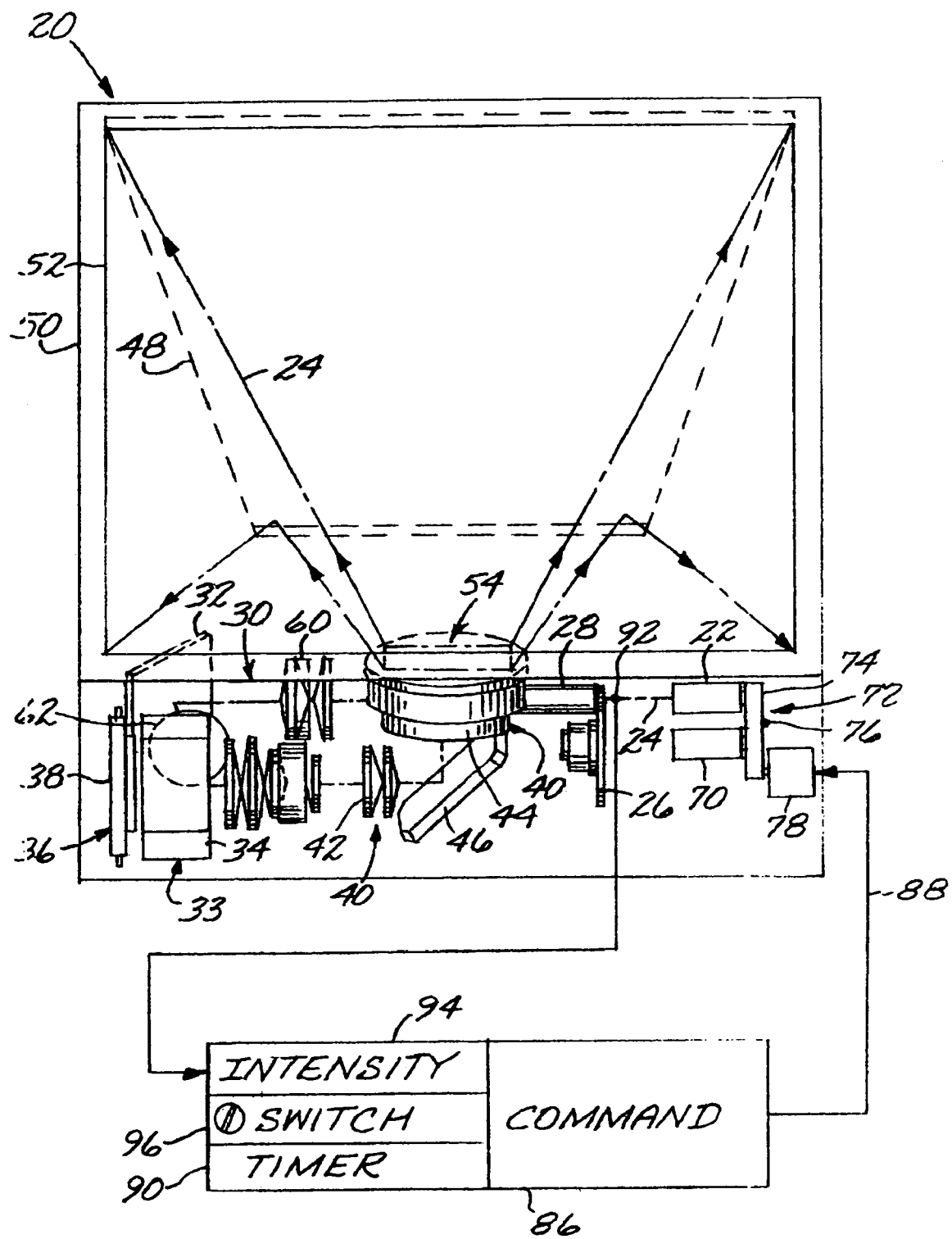
FIG. 1 is a schematic front view of a display device, using a first embodiment of the lamp mount of the present approach.

FIG. 1 depicts a display device 20 that includes a lamp 22 producing as an output an output light beam 24. The lamp 22 may be of any operable type, but is typically a polychromatic lamp, and most preferably a polychromatic metal halide lamp. The lamp 22 preferably operates in the range of 10-24 watts power. Higher wattage lamps, such as those operating in the 100-watt range, are too bright for many applications. Additionally, the higher-wattage lamps produce too much heat to be used in the sealed housing structures that are preferred for the present display device, as will be discussed more fully below. The metal halide lamp produces a uniform output light beam 24. The lamp 22 is illustrated in a lamp alignment position, whereat the output light beam 24 is aligned to enter the optics of the remainder of the display device 20.

Optionally, a color wheel 26 having red, blue, and green segments receives the output light beam 24 from the lamp 22. The color wheel 26 spins in the output light beam 24 so that the output light beam 24 is sequentially colored with the primary red-blue-green colors that are combined to produce a full-color image after subsequent modulation. A white fourth segment may also be present. The color wheel 26 is not required if the projected image is to be a black-white image.

An integrator 28 receives the output light beam 24 from the color wheel 26 (or directly from the lamp in the absence of the color wheel 26). The integrator 28 is preferably a solid transparent rod or a hollow pipe that provides multiple internal reflections of the output light beam 24. The integrator has two effects. It makes the output light beam 24 more uniform over its cross section and prevents the formation of an image of the structure of the lamp 22. Second, the integrator 28 shapes the output light beam 24 to have the desired peripheral shape of the final projected image. In the usual case, the final projected image is rectangular, so that the output of the integrator 28 is rectangular with an aspect ratio that matches that of the spatial light modulator. The integrator 28 does not spatially modulate the output light beam 24.

An illumination lens 30 receives the output light beam 24 from the integrator 28. The illumination lens 30 may include one lens element or more than one lens element. In the illustration, the illumination lens has two illumination lens elements 60 and 62. The illumination lens 30 images the exit end of the integrator 28 onto the spatial light modulator to be discussed subsequently.

An illumination fold mirror 32 receives the output light beam 24 from the first illumination lens element 60 and reflects the output light beam 24. The illumination fold mirror 32 changes the direction of the output light beam 24. In combination with other fold mirrors in the display device 20, the illumination fold mirror 32 allows the optics of the display device 20 to fit within a compact envelope. After the output light beam 24 reflects from the illumination fold mirror 32, it passes through the second illumination lens element 62.

A light director 33, preferably a total internal reflection (TIR) prism 34, receives the output light beam 24 from the illumination fold mirror 32. An internal reflective surface (not shown) of the TIR prism 34 is oriented such that the output light beam 24 that enters the TIR prism 34 is totally reflected.

A spatial light modulator 36 receives the output light beam 24 from the light director 33 (which is preferably the TIR prism 34) and spatially modulates the output light beam 24. The spatial light modulator 36 receives image information in electronic form from an image source (not shown). The spatial light modulator 36 then spatially modulates the output light beam 24 with that electronic image information. The spatial light modulator 36 is preferably a digital micromirror device 38. The digital micromirror device 38 is an array of movable small mirrors, each of which small mirrors serves as the modulator for one pixel of the resulting image. By controlling the orientations of the individual small mirrors, each pixel of the incident output light beam 24 may be selectively reflected in the proper direction to eventually form part of the reflected image (an illuminated pixel), or selectively reflected in another direction so that it does not form part of the reflected image (a dark pixel). The result is that the output light beam 24 is spatially modulated.

In the embodiment wherein the light director 33 is the TIR prism 34, the output light beam 24 is sent back to the TIR prism 34 in its spatially modulated form. The internal reflective surface of the TIR prism 34 is oriented such that the incident output light beam 24 that is received back from the spatial light modulator 36 is not reflected by the internal reflective surface and passes straight through the TIR prism 34.

A projection lens 40 receives the output light beam 24 in its spatially modulated form from the TIR prism 34. In the illustrated design, the projection lens 40 has at least a first projection lens element 42, and a second projection lens element 44 that is spaced apart from the first projection lens element 42. Taken together, the lens elements of the projection lens 40 focus the output light beam 24 onto the display screen that is viewed by the user of the display device 20, as discussed subsequently. The lenses of the projection lens 40 constitute an optics system 54 that projects the spatially modulated output light beam.

A projection lens fold mirror 46 is disposed between the first projection lens element 42 and the second projection lens element 44. The output light beam 24 passes through the first projection lens element 42, reflects from the projection lens fold mirror 46, and passes through the second projection lens element 44.

A projection fold mirror 48 receives the output light beam 24 from the projection lens 40 (and specifically from the second projection lens element 44) and redirects the output light beam to the display screen to be discussed subsequently.

The display device 20 preferably includes a housing 50 in which the lamp 22, the color wheel 26, the integrator 28, the illumination lens 30, the illumination fold mirror 32, the light director 33, the spatial light modulator 36, the projection lens 40, the projection lens fold mirror 46, and the projection fold mirror 48 are received. The housing 50 may be unsealed or sealed, but is preferably sealed to exclude from the interior of the housing 50 substances such as dust, corrosives, abrasives, and other environmental elements that degrade the performance of the optical elements of the display device 20. The sealing of the housing 50 preferably is semi-permanent, meaning that it is secure and hermetic when the display device 20 is in the field, but the seal may be intentionally breached when the display device 20 is returned to a service facility for internal servicing.

The display device 20 preferably includes a display screen 52 that receives the output light beam 24 from the projection fold mirror 48. The display screen 52 typically forms one wall of the housing 50. The output light beam 24 is desirably incident upon the display screen 52 substantially perpendicularly to the display screen 52. As a result, the display screen 52 need not be holographic in structure.

The optical elements of the display device 20 discussed to this point are presented as a preferred set of optical elements. However, any operable set of optical elements may be utilized in conjunction with the lamp mount structure that is to be discussed next.

A characteristic of many lamps 22, and particularly the 10-24 watt metal halide lamps that are preferred for use in the sealed housing 50, is that their operating lives, expressed as the mean time to failure (MTTF), are relatively short. Failure of the lamp 22 in service, and in an inaccessible location such as within the sealed housing 50, would render the display device 20 unusable in conventional technology. The present approach, on the other hand, allows the lamp to be automatically replaced to avoid such an interruption of service.

The lamp 22 and at least one spare lamp 70 are supported on a lamp mount 72. Three embodiments of the lamp mount 72 are discussed, the first in FIG. 1, the second in FIGS. 2-4, and the third in FIG. 5. Only the lamp mount 72 and related structure are shown in the embodiments of FIGS. 2-4 and FIG. 5, with the other optical elements of FIG. 1 omitted. However, the embodiments of FIGS. 2-4 and FIG. 5 may be used with the optical elements of FIG. 1, or other operable optical elements. Various operable features of the lamp mount 72 illustrated in the various embodiments of FIGS. 1, 2-4, and 5 may be used with the other embodiments, as long as they are compatible.

In these illustrated embodiments, only one spare lamp 70 is provided, but there could be additional spare lamps. The lamp mount 72 selectively and controllably moves either the lamp 22 or the spare lamp 70 into the lamp alignment position so that its output light beam 24 enters the optics of the display device 20.

The lamp mount 72 preferably comprises a lamp support base 74 upon which the lamp 22 and the spare lamp 70 are supported. The lamp 22 and the spare lamp 70 are preferably each electrically connected to voltage sources at all times, but only one of the lamp 22 and the spare lamp 70 is powered and illuminated at a time by applying a voltage and current to it. The lamp 22 is in the lamp alignment position and is illuminated, and the spare lamp 70 is not illuminated, until the occurrence of some event. Thereafter, the lamp support base 74 is physically moved so that the spare lamp 70 is in the lamp alignment position and is powered to illuminate, and power is removed so that the lamp 22 is no longer illuminated.

Figure 2:
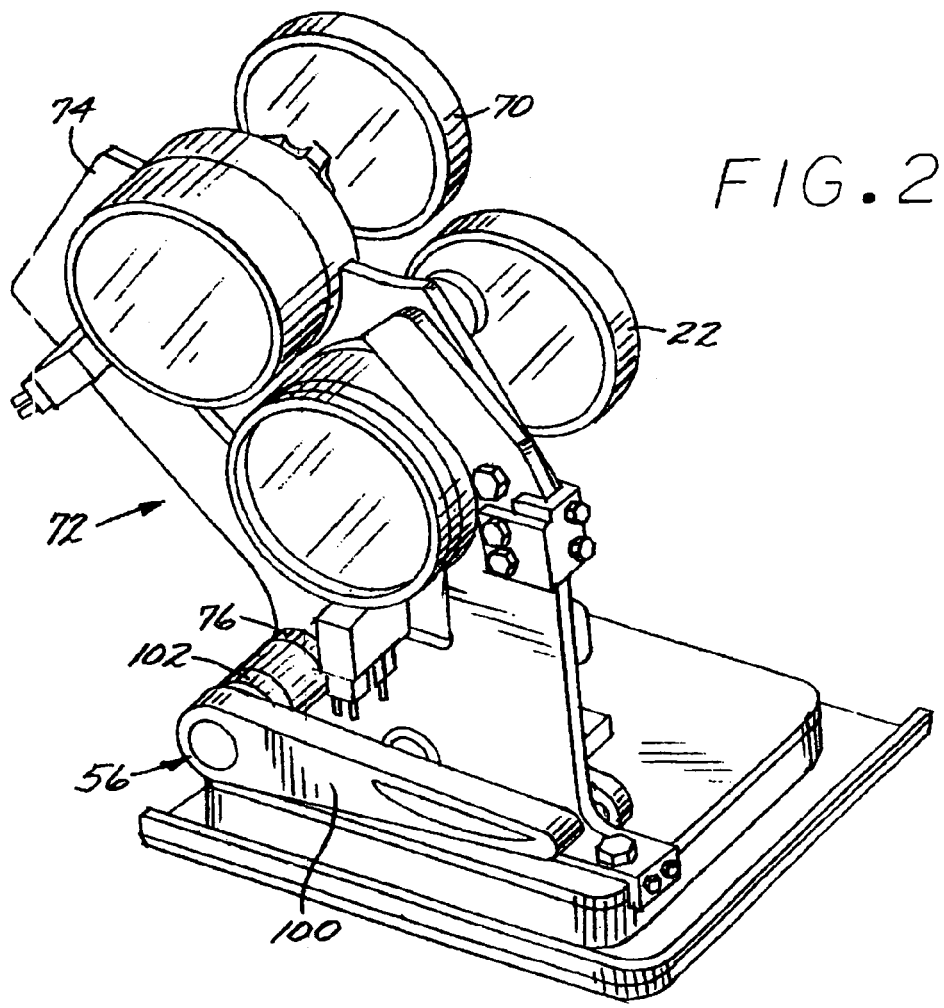
FIG. 2 is perspective view of a second embodiment of the lamp mount.
Figure 3:
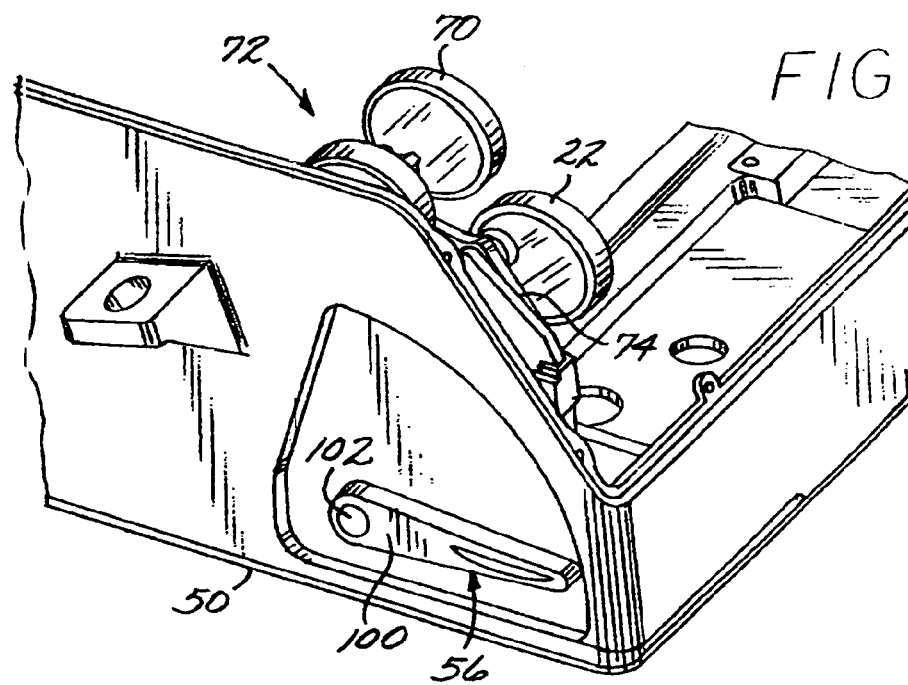
FIG. 3 is a perspective view of the second embodiment of the lamp mount, inside a housing.
Figure 4:
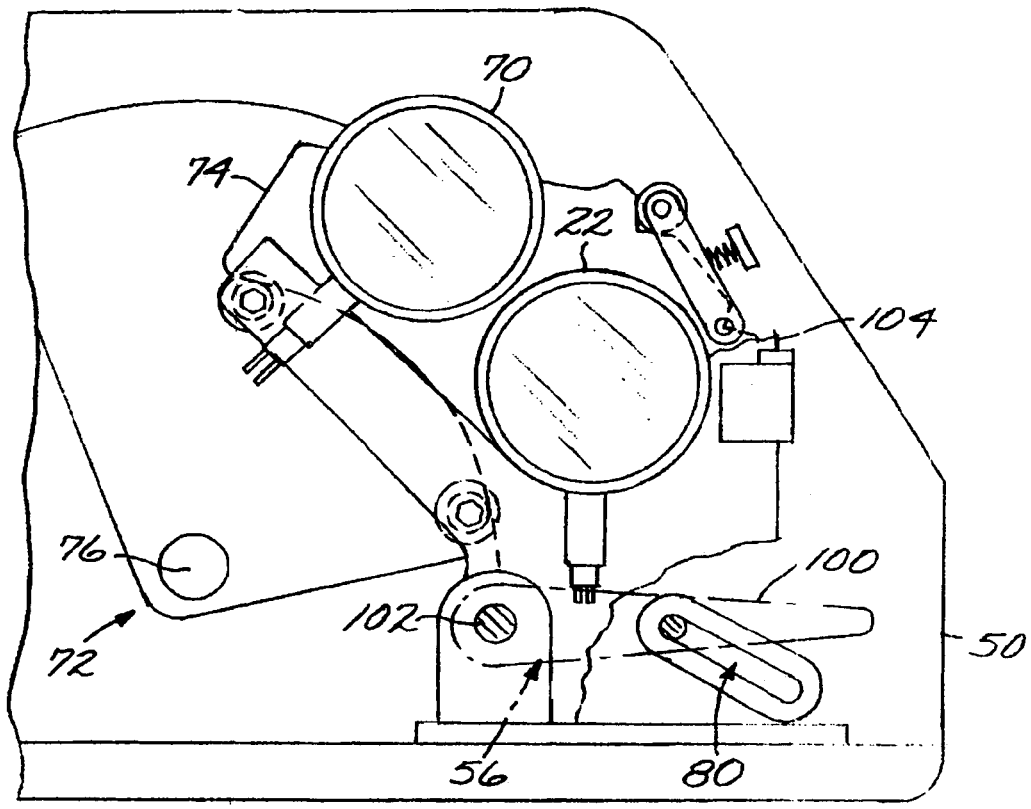
FIG. 4 is a schematic elevational view of the second embodiment of the lamp mount.
Figure 5:
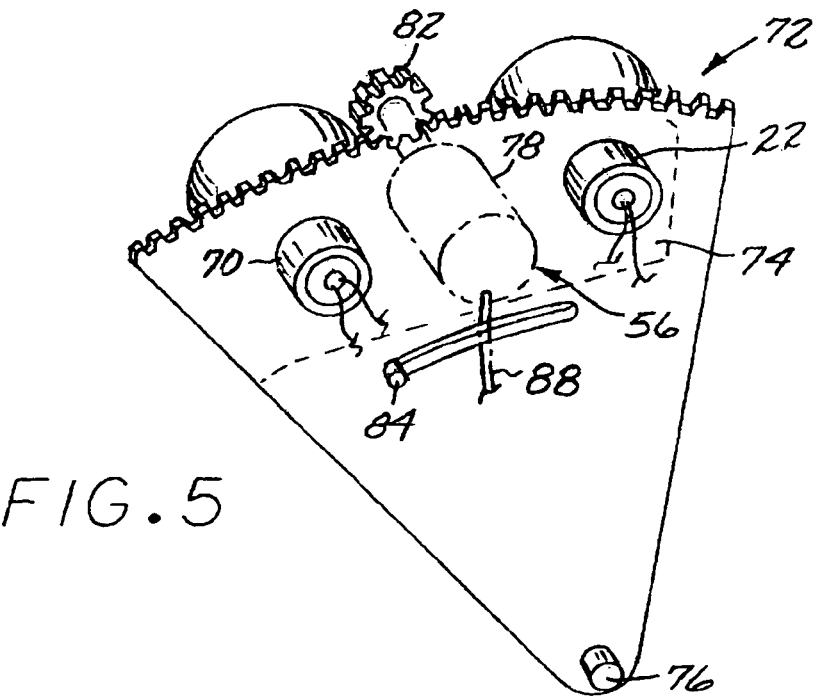
FIG. 5 is a schematic perspective view of a third embodiment of the lamp mount.

The movement of the lamp support base 74 may be accomplished in any operable manner. Preferably and as illustrated, the lamp support base 74 is pivotably supported on a pivot 76. In the embodiments of FIGS. 1 and 5, a drive motor 78 located inside or outside of the housing 50 causes the lamp support base 74 to move in the manner described above. In the embodiment of FIGS. 2-4, a manually operated support base drive 56, illustrated in the form of a lever 100 as the manual control, is positioned outside of the housing 50, and extends through the housing 50 using a mechanical linkage 102, causes the lamp support base 74 to move in the manner described above. In the embodiment of FIGS. 2-4, the lever 100 is connected to the lamp support base 74 through a pin-and-pivot follower 80 that is part of the mechanical linkage 102. A detent structure 104 aids in holding the lamp support base 74 in the proper position to align one of the lamps 20 or 70 in the lamp alignment position. In the embodiment of FIG. 5, the support base drive 56 is in the form of a drive motor 78 that is connected to the lamp support base 74 through a rack-and-pinion gear 82, with a limit pin structure 84 to limit the motion of the lamp support base 74. Although a pivoting lamp support base 74 is preferred, linear or other types of movements may be used as well.

Inasmuch as they include controllable electric motors 78, the embodiments of FIGS. 1 and 5 may be controlled by a lamp-mount controller 86. The lamp-mount controller 86 sends an output command 88 to the motor 78 to move the lamp support base 74 in the manner described earlier. The output command 88 of the lamp-mount controller 86 is initiated responsive to any preselected criterion. In one approach, the lamp-mount controller 86 sends the output command responsive to a timer 90, that typically is set for some fraction of the MTTF of the lamp 22. For example, the replacement of the lamp 22 by the spare lamp 70 could be timed to occur at 80 percent of the expected MTTF of the lamp 22. In another approach, a light intensity monitor 92 monitors the intensity of the output light beam 24, and provides the intensity to an intensity module 94 of the lamp-mount controller 86. When the light intensity of the output light beam 24 falls below some preselected criterion, for example below 50 percent of the initial output light beam 24, the output command 88 is sent. In yet another approach, a manual switch 96 is provided so that the operator of the digital display 20 may manually change the lamps. In most cases, the lamp-mount controller 86 will not have all of these capabilities, but they are presented in FIG. 1 as exemplary of approaches that may be taken.

The embodiment of FIGS. 2-4, on the other hand, is fully manual. The lever 100, and thence the movement of the lamp mount 72, is at the discretion of the human operator. Upon operation of the lever 100, the changing of the lamps 20, 70 is automated and does not require intrusion into the interior of the housing 50.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A display device comprising:
    a lamp having an output light beam, wherein the lamp is disposed in a lamp alignment position when it projects the output light beam;
    a spatial light modulator that receives the output light beam and controllably spatially modulates the intensity of the output light beam;
    an optics system that projects the spatially modulated output light beam; and
    a lamp mount upon which the lamp and at least one spare lamp are supported, wherein the lamp mount selectively and controllably moves one of the lamp and the at least one spare lamp into the lamp alignment position.

2. The display device of claim 1, further including
    a housing in which the lamp, the spatial light modulator, the optics system, and the lamp mount are enclosed.

3. The display device of claim 1, further including
    a sealed housing in which the lamp, the spatial light modulator, the optics system, and the lamp mount are enclosed.

4. The display device of claim 1, further including
    a sealed housing in which the lamp, the spatial light modulator, the optics system, and the lamp mount are enclosed, and
    a display screen that forms a wall of the sealed housing.

5. The display device of claim 1, wherein the lamp operates at a power of from about 10 to about 24 watts.

6. The display device of claim 1, wherein the lamp mount comprises
    a lamp support base upon which the lamp and the at least one spare lamp are supported, and
    a support base drive that moves the lamp support base between a first support-base position in which the lamp is disposed in the lamp alignment position and additional support-base positions in which the each of the spear lamps is respectively disposed in the lamp alignment position.

7. The display device of claim 1, wherein the lamp mount comprises
    a pivoting lamp support base upon which the lamp and the at least one spare lamp are supported, and
    a support base drive that pivotably moves the lamp support base between a first support-base position in which the lamp is disposed in the lamp alignment position and additional support-base positions in which the each of the spare lamps is respectively disposed in the lamp alignment position.

8. The display device of claim 1, wherein the lamp mount comprises
    a lamp support base upon which the lamp and the at least one spare lamp are supported,
    a motorized support base drive that moves the lamp support base between a first support-base position in which the lamp is disposed in the lamp alignment position and additional support-base positions in which the each of the spare lamps is respectively disposed in the lamp alignment position and
    a lamp-mount controller that controls the support base drive to move the respective lamps into the lamp alignment position.

9. The display device of claim 1, wherein the lamp mount comprises
    a lamp support base upon which the lamp and the at least one spare lamp are supported,
    a motorized support base drive that moves the lamp support base between a first support-base position in which the lamp is disposed in the lamp alignment position and additional support-base positions in which the each of the spare lamps is respectively disposed in the lamp alignment position, and
    a lamp-mount controller that controls the support base drive to move the respective lamps into the lamp alignment position, wherein the lamp-mount controller comprises a manually operated switch.

10. The display device of claim 1, wherein the lamp mount comprises
    a lamp support base upon which the lamp and at least one spare lamp are supported,
    a motorized support base drive that moves the lamp support base between a first support-base position in which the lamp is disposed in the lamp alignment position and additional support-base positions in which the each of the spare lamps is respectively disposed in the lamp alignment position, and
    a lamp-mount controller that controls the support base drive to move the respective lamps into the lamp alignment position, wherein the lamp-mount controller comprises a timer.

11. The display device of claim 1, wherein the lamp mount comprises
    a lamp support base upon which the lamp and the at least one spare lamp are supported,
    a motorized support base drive that moves the lamp support base between a first support-base position in which the lamp is disposed in the lamp alignment position and additional support-base positions in which each of the spare lamps is respectively disposed in the lamp alignment position, and
    a lamp-mount controller that controls the support base drive to move the respective lamps into the lamp alignment position, wherein the lamp-mount controller comprises a monitor of the intensity of the output light beam or the spatially modulated output light beam.

12. The display device of claim 1, wherein the lamp mount comprises
    a lamp support base upon which the lamp and the at lest one spare lamp are supported,
    a manually operated support base drive that moves the lamp support base between a first support-base position in which the lamp is disposed in the lamp alignment position and additional support-base positions in which each of the spare lamps is respectively disposed in the lamp alignment position.

13. The display device of claim 1, further including
a housing in which the lamp, the spatial light modulator, the optics system, and a portion of the lamp mount are enclosed, and wherein the lamp mount comprises
a lamp support base upon which the lamp and the at least one spare lamp are supported, and
a manually operated support base drive that moves the lamp support base between a first support-base position in which the lamp is disposed in the lamp alignment position and additional support-base positions in which each of the spare lamps is respectively disposed in the lamp alignment position, wherein a manual control of the manually operated support base drive extends outside of the housing.

14. A display device comprising:
a lamp operating at a power of from about 10 to 24 watts and having an output light beam, wherein the lamp is disposed in a lamp alignment position when it projects the output light beam;
a spare lamp;
a spatial light modulator that receives the output light beam and controllably spatially modulates the intensity of the output light beam;
an optics system that projects the spatially modulated output light beam;
a lamp mount upon which the lamp and spare lamp are supported, wherein the lamp mount selectively and controllably moves one of the lamp and the spare lamp into the lamp alignment position; and
a sealed housing in which the lamp, the spatial light modulator, the optics system, and the lamp mount are enclosed.

15. The display device of claim 14, further including a display screen that forms a wall of the housing.

16. The display device of claim 14, wherein the lamp mount comprises
a lamp support base upon which the lamp and the spare lamp are supported, and
a support base drive that moves the lamp support base between a first support-base position in which the lamp is disposed in the lamp alignment position and additional support-base positions in which the each of the spare lamps is respectively disposed in the lamp alignment position.

17. The display device of claim 14, wherein the lamp mount comprises
a pivoting lamp support base upon which the lamp and the spare lamp are supported, and
a support base drive that pivotably moves the lamp support base between a first support-base position in which the lamp is disposed in the lamp alignment position and additional support-base positions in which the each of the spare lamps is respectively disposed in the lamp alignment position.

18. The display device of claim 14, wherein the lamp mount comprises
a lamp support base upon which the lamp and the spare lamp are supported, and
a manually operated support base drive that moves the lamp support base between a first support-base position in which the lamp is disposed in the lamp alignment position and additional support-base positions in which each of the spare lamps is respectively disposed in the lamp alignment position, wherein a manual control of the manually operated support base drive extends outside of the housing.

19. The display device of claim 14, wherein the lamp mount comprises
a lamp support base upon which the lamp and the spare lamp are supported,
a motorized support base drive that moves the lamp support base between a first support-base position in which the lamp is disposed in the lamp alignment position and additional support-base positions in which the each of the spare lamps is respectively disposed in the lamp alignment position, and
a lamp-mount controller that controls the support base drive to move the respective lamps into the lamp alignment position.

20. The display device of claim 14, wherein the lamp mount comprises
a lamp support base upon which the lamp and the spare lamp are supported,
a motorized support base drive that moves the lamp support base between a first support-base position in which the lamp is disposed in the lamp alignment position and additional support-base positions in which the each of the spare lamps is respectively disposed in the lamp alignment position, and
a lamp-mount controller that controls the motorized support base drive to move the respective lamps into the lamp alignment position, wherein the lamp-mount controller comprises
a manually operated switch,
a timer, or
a monitor of the intensity of the output light beam or the spatially modulated output light beam.

21. A display device comprising:
a lamp operating at a power of from about 10 to about 24 watts and having an output light beam, wherein the lamp is disposed in a lamp alignment position when it projects the output light beam;
a spare lamp;
a spatial light modulator that receives the output light beam and controllably spatially modulates the intensity of the output light beam;
an optics system that projects the spatially modulated output light beam;
a lamp mount upon which the lamp and spare lamp are supported, wherein the lamp mount selectively and controllably moves one of the lamp and the spare lamp into the lamp alignment position;
a sealed housing in which the lamp, the spatial light modulator, the optics system, and the a portion of the lamp mount are enclosed; and
a display screen that forms a wall of the housing, wherein the lamp mount comprises
a lamp support base within the housing and upon which the lamp and the spare lamp are supported, and
a manually operated support base drive that moves the lamp support base between a first support-base position in which the lamp is disposed in the lamp alignment position and additional support-base positions in which each of the spare lamps is respectively disposed in the lamp alignment position, wherein a manual control of the manual control of the manually operated support base drive extends outside of the housing.

* * * * *